United States Patent [19]

Ochi et al.

[11] Patent Number: 4,874,238

[45] Date of Patent: Oct. 17, 1989

[54] METHOD AND DEVICE FOR MEASUREMENT WITH LASER BEAM

[75] Inventors: Tatsuyuki Ochi; Nobuo Tanaka; Kohei Mio, all of Yokohama, Japan

[73] Assignee: Kajima Corporation, Tokyo, Japan

[21] Appl. No.: 66,423

[22] Filed: Jun. 25, 1987

[30] Foreign Application Priority Data

Aug. 27, 1986 [JP] Japan .............................. 61-199096
Dec. 3, 1986 [JP] Japan .............................. 61-286783
Jan. 26, 1987 [JP] Japan .............................. 62-13986

[51] Int. Cl.⁴ .......................... G01C 1/00; G02B 26/08
[52] U.S. Cl. ........................................ 356/1; 356/141; 356/152; 350/6.4; 350/484
[58] Field of Search .................. 356/1, 4, 5, 141, 152; 350/6.4, 6.2, 484

[56] References Cited

U.S. PATENT DOCUMENTS

| | | | |
|---|---|---|---|
| 3,714,657 | 1/1973 | Lapeyre | 356/152 |
| 3,865,491 | 2/1975 | Hogan | 356/152 |
| 4,468,119 | 8/1984 | Hamar | 356/152 |
| 4,688,933 | 8/1987 | Lapeyre | 356/1 |
| 4,700,301 | 10/1987 | Dyke | 356/1 |

FOREIGN PATENT DOCUMENTS 2410254 6/1979 France .
2152320A 7/1985 United Kingdom .

Primary Examiner—Thomas H. Tarcza
Assistant Examiner—Linda J. Wallace
Attorney, Agent, or Firm—Armstrong, Nikaido, Marmelstein, Kubovcik & Murray

[57] ABSTRACT

A method and a device for measuring an angle required for ascertaining the coordinates of a measuring point comprise two laser beams which are rotatingly emitted from a reference point in opposite directions at the same angular velocity and, at a measuring point, time intervals for receiving the two laser beams are obtained and used for the ascertaining of the measuring point coordinates. The laser device generates two laser beams rotating in opposite angular directions at the same angular velocity. The laser beams are reflected twice in a pentaprism, a compound prism and a rectangular mirror. Errors for mounting the prisms and mirror are thus eliminated resulting in extremely small rotation irregularities. In a method and a device for measuring an angle in 3-dimensional space, laser beams in sectors and a sensor for detecting said laser beam are used; thereby, various angles required for determining coordinates in 3-dimensional space can be measured.

6 Claims, 16 Drawing Sheets

METHOD AND DEVICE FOR MEASUREMENT WITH LASER BEAM

BACKGROUND OF THE INVENTION

1. Field of the Invention

The present invention relates to a method and a device for measurement using laser light. In more detail, the present invention relates to a device for rotatingly irradiating two laser light beams, longitudinally symmetrical, and a method and a device for measuring an angle required for obtaining the coordinates of a predetermined point.

2. Prior Art

According to the triangular survey known in the prior art for obtaining a position on a plane, the transit was normally used. In the method using a transit, however, at least two persons were required including a surveying technician for operating the transit and an operator supporting a pole. In addition, several operators skilled in the surveying work were also needed while spending considerable operating time.

In these circumstances, the applicants of the present invention disclosed a method of surveying by using laser light in Japanese Patent Appln. No. 198,688/1985. Although this method offers an excellent survey, communications (practically wireless telecommunications) are required between a reference point and a measuring point. Thereby, survey errors were apt to occur due to error operation of the radio system, etc.

According to the principle of the invention of said application, prism and mirror, etc. are used to generate laser light in a device for rotatingly irradiating laser light. However, these means must be mounted with very high accuracies. If installation errors occur for mounting the prism and mirror, etc., the accuracies of measurement are greatly affected.

In addition, fluctuation and irregularities for rotating the laser beams should be made minimum. Consequently, the rotational irregularities in the laser device for rotatingly irradiating laser light must be made smaller, because measuring accuracies are significantly affected by irregularities, if any, in the rotation of the device for rotatingly irradiating laser light. In the above, it is known in the prior art that, the lower the rotating speed of the device for rotatingly irradiating laser light generally, the larger the said rotating irregularities become.

In addition, the prior art cannot provide a method for measuring the coordinates of a point of measurement in 3-dimensional space (3-D measurement , although a position on a plane (2-D coordinates) can be measured. Another difficulty associated with the method described above is that the range of measurement is narrow because the laser light used for the measurement based on the prior art is formed in a beam. In the measurement on a plane, no particular problems occur even if laser light is formed in beam.

In a 3-D measurement, however, inconveniency may arise during measuring work.

OBJECT AND SUMMARY OF THE INVENTION

The present invention has been completed to provide a method and a device for measurement using laser without creating survey errors caused by error operation with the communication device between a reference point and a measuring point, while maintaining unchanged the advantages of the survey method using laser.

One object of the present invention is to offer a device that can create two rotating laser beams, always symmertrical in regard to predetermined axis, in high accuracies without being affected by errors of mounting prism, mirror, etc.

Another object of the present invention is to provide a laser device for rotatingly irradiating laser light with small rotating irregularities even at a low rotating speed.

Still another object of this invention is to present a method and a device for measuring the direction of a measuring point in regard to a reference line (a fixed straight line used as a reference for measurement) in 3-D space using laser, said method and device having an expanded range of measurement.

According to the present invention, there is provided a method of detecting an angle using laser, in which a laser device for irradiating two laser beams is mounted at a reference point, said two laser beams are rotated in opposite angular directions at a constant and non-fluctuating angular velocity, and on the other hand, a sensor for detecting said laser beams and a time measuring device for measuring precise time are mounted at a measuring point, said sensor and said time measuring device measure time intervals for detecting said laser beams in rotation in opposite angular directions, and said time intervals are entered in a computing device that calculates an angle between said measuring point and said reference line.

Further there is provided a device for detecting an angle using laser, comprising a laser device for rotatingly irradiating two laser beams in a horizontal plane, said laser device being placed at a reference point, a measuring point sensor for detecting said laser beams, said sensor being placed at a measuring point, a time measuring device for measuring time intervals for receiving said laser beams and an angle computing display device that calculates an angle between a symmetrical axis of said two laser beams and said measuring point and then displays said angle.

Further, there is provided a device for generating two laser beams that rotate in opposite angular directions at the same angular velocity, comprising a pentaprism placed at the center of a rotating base that is rotated, by a motor rotating at a non-fluctuating velocity, on a plane, a laser oscillator placed on the rotation axis of said motor, a laser beam emitted from said laser oscillator being deflected by 90 degrees by means of said pentaprism, a compound prism being placed in the direction of optical axis of said pentaprism on said rotating base, said compound prism having a beam splitter and two rectangular reflective surfaces, laser beam emitted from said pentaprism being divided into two components, one of said two components being projected outwardly as a beam of said two laser beams, the other of said two components being returned after changing the height to the center of rotation, a rectangular mirror being placed on a mounting rack so that the intersection part of said mirror crosses in rectangle with the rotation axis of said motor, and said rectangular mirror reflecting the laser beam returned to the rotation center by means of said compound prism as the other beam of said two laser beams, thus said two laser beams that rotate in opposite angular directions at the same angular velocity being obtained.

Further, there is provided a laser device for rotatingly irradiating laser light, which is used in an angle detecting device using laser comprising a laser device that is placed at a reference point for measurement and irradiates two laser beams rotating in opposite angular directions in a horizontal plane, a measuring point sensor for detecting said two laser beams at a measuring point, a time measuring device for measuring time intervals of receiving said laser beams and an angle computing and displaying device, comprising a laser oscillator, a rotating base for dividing a laser light emitted from said laser oscillator into a beam in a first direction and the other beam in a second direction opposite to said first direction a fixed mirror for reversing said laser beam divided in said second direction by 180 degrees, the rotation axis of said rotating base being connected to the vertical gimbals axis of a gyro and a precession weight mounted on either of two intersections between a horizontal gimbals and the rotation axis of a gyro rotor.

Accordingly, there is provided a method of measuring an 3-dimensional angle by using laser, in which a laser device that rotatingly irradiates two laser light sectors in opposite angular directions at the same angular velocity is placed at a reference point, a sensor for detecting laser beams emitted from said laser device is placed at a measuring point, and time intervals for detecting said laser beams emitted from said laser device and rotating in opposite angular directions are measured and entered in a computing device that calculates an angle between a straight line connecting said measuring point and reference point and a plane containing said reference point.

Further, there is provided a device for measuring an angle in 3-dimensional space, comprising a laser device for rotatingly irradiating laser light that is mounted at a reference point, a laser beam detecting sensor placed at a measuring point, a time measuring device for measuring time intervals for receiving said laser beams and a computing device that receives measured values from said time measuring device and calculates an angle between a straight line connecting said measuring point and said reference point, said laser device being composed so that said laser light sectors rotate in opposite angular directions at the same angular velocity.

It is preferred to use a device based on the present invention for generating oppositely rotating laser beams, with a method and a device for detecting an angle using laser light, according to the present invention.

In addition, it is also preferable to use a laser device for rotatingly irradiating laser light with a method and a device for detecting an angle using laser light or an angle measuring device in 3-D space, according to the present invention.

With a laser device for rotatingly irradiating laser light according to the present invention, it is preferable to drive a gyro rotor by a speed controlled motor which is electrically powered through, for example, a slip ring. Thus, irregularities of vertical gimbals axis rotation for the gyro become inversely proportional to the rotating speed of the rotating base is rather low, rotation irregularities can be made small.

BRIEF DESCRIPTION OF THE DRAWINGS

FIGS. 14 through 16 show a pentaprism, a compound prism and a rectangular mirror.

DETAILED DESCRIPTION AND THE PREFERED EMBODIMENTS OF THE INVENTION

Several embodiments of the present invention are described in the following referring to FIGS. 1 through 26.

First refer to FIGS. 1 through 11 in which an embodiment, using two sets of the angle detecting devices based on this invention, are illustrated.

Devices, to be used when survey method of the present invention applies, comprise a laser device for rotatingly irradiating two laser beams, rotating in opposite angular directions on a horizontal plane at uniform rotating velocities while being located at a reference point, a measuring point sensor for detecting the laser beams at a measuring point, a time measuring device (receiving light interval measuring circuit) for measuring time intervals to receive laser beams and a coordinate computing display device for calculating an angle between the reference line and the measuring point and displaying the angle.

Figure 1:
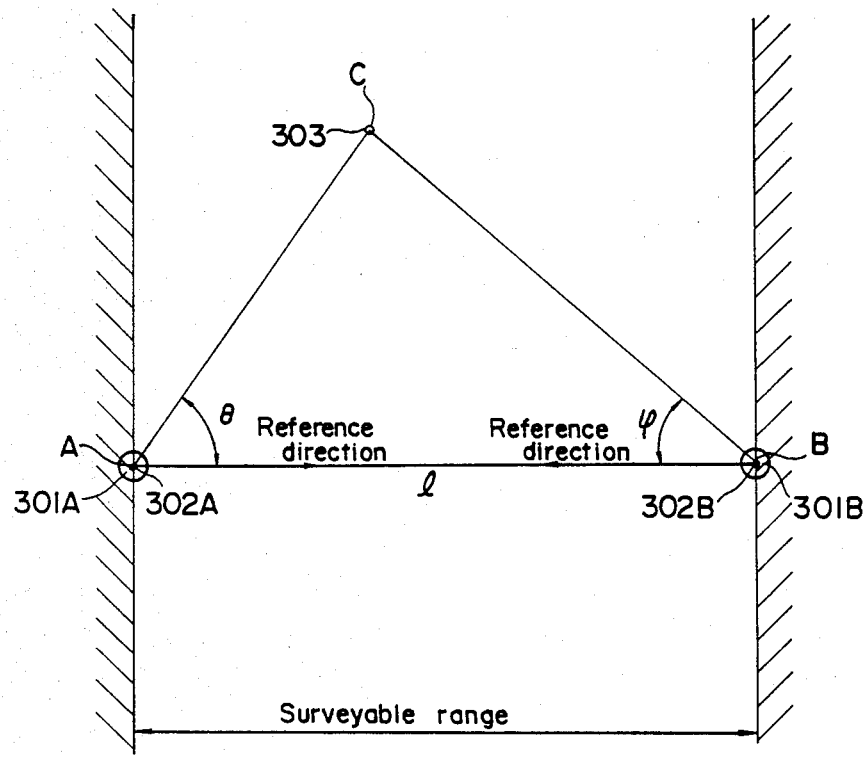
FIGS. 1 and 2 show plan and front views of a method of detecting an angle using laser beam based on the present invention and the layout of relevant equipment and devices.
Figure 2:
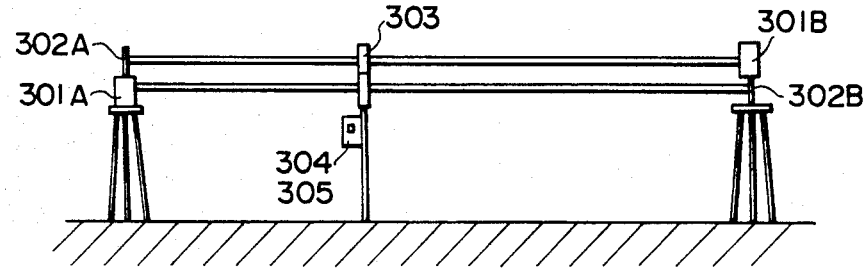

The layout of said devices and equipment are shown in FIGS. 1 and 2, where A and B represent reference points and C is a measuring point. At reference point A, said laser device 301A is installed together with a symmetrical axis detecting sensor 302A which detects the direction of symmetrical axis for the other laser device 301B (direction of the reference axis). At reference point B, laser device 301B is mounted along with a symmetrical axis detecting sensor 302B that detects the direction of the symmetrical axis for the other laser device 301A. In addition, a measuring point sensor 303, for detecting laser light from laser device 301A and laser device 301B, is installed at measuring point C at which said time measuring device (receiving light interval measuring circuit) 304 and coordinate computing display device (microcomputer) 305 are provided. l represents the distance between reference points A and B which has been pre measured.

Figure 3:
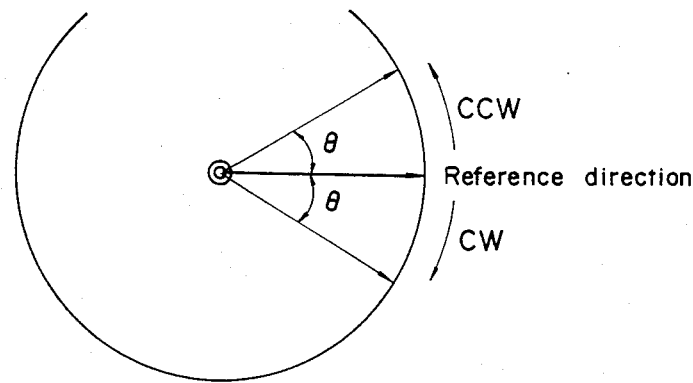
FIGS. 3 and 4 illustrate the relationship between the interval and angle for detecting laser light at a measuring point.
Figure 4:
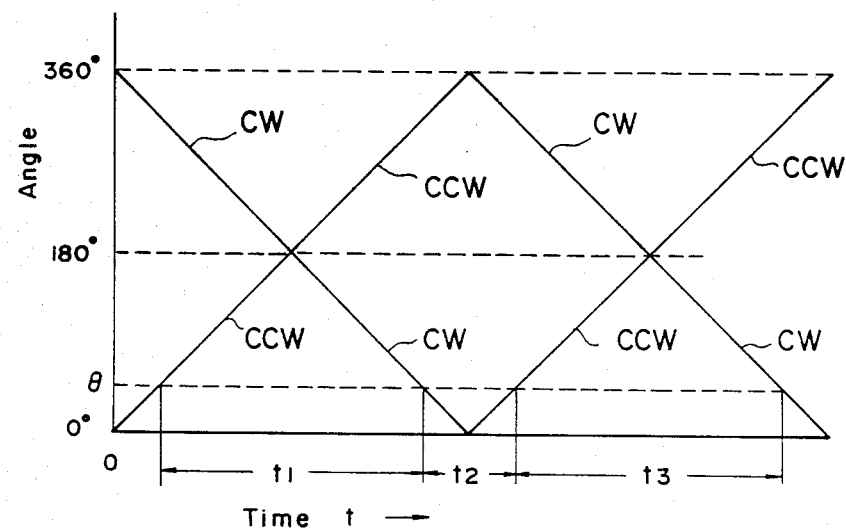

Now the relationship between laser light receiving time intervals and angle, at measuring point C, is described in the following referring to FIGS. 3 and 4. Time intervals $t_1, t_2, t_3, \ldots$ can be measured at measuring point C. An angle $\theta$, between the reference direction and the measuring point, is represented by $$\theta = \frac{t_1 - t_2}{|t_1 - t_2|} \times \frac{t_2}{t_1 - t_2} \times 180°$$

where $t_1$ represents the interval from the time of receiving laser beam CCW (laser beam rotating counterclockwise in regard receiving laser beam CCW (laser beam rotating counterclockwise in regard to the reference direction) to the time of receiving laser beam CW (laser beam rotating clockwise in regard to the reference direction), while $t_2$ denoting the interval from the time of receiving laser beam CW to the time of receiving CCW.

Figure 5:
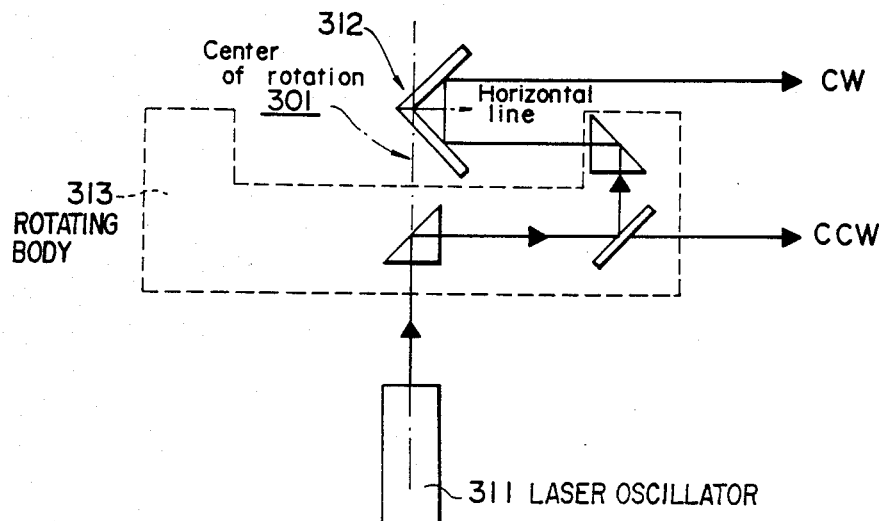
FIGS. 5 and 6 are the front and plan views of the laser device for rotatingly irradiating laser light.
Figure 6:
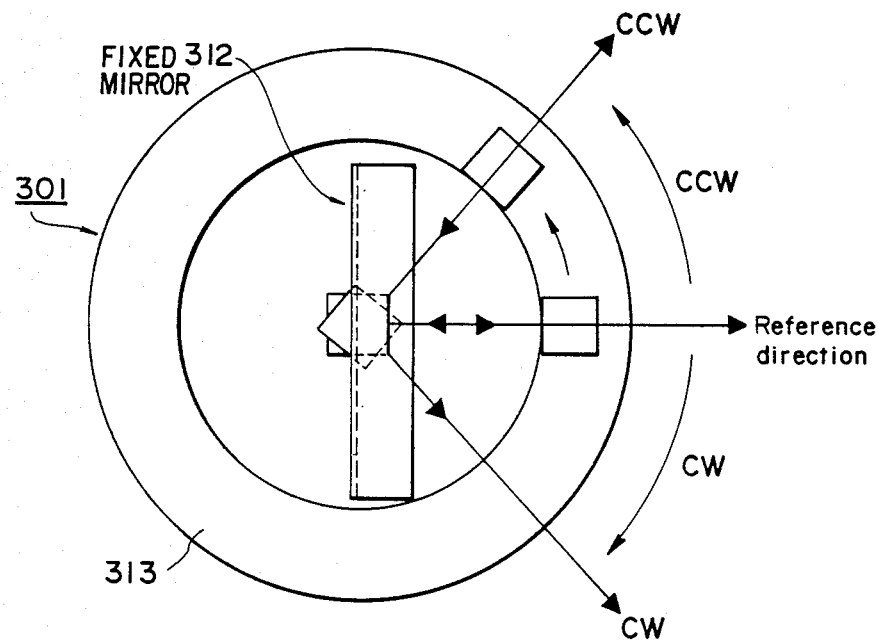

The detail of laser device 301 is shown in FIGS. 5 and 6. Laser device 301 is a device that rotatingly irradiates two oppositely rotating laser beams in a horizontal plane as described before, comprising a laser oscillator 311, a fixed mirror 312 for irradiating two oppositely rotating laser beams CW, CCW after receiving laser light from laser oscillator 311 and a rotating body 313 equipped with said laser oscillator and said fixed mirror and rotated at a constant rotating velocity without irregularities.

Figure 7:
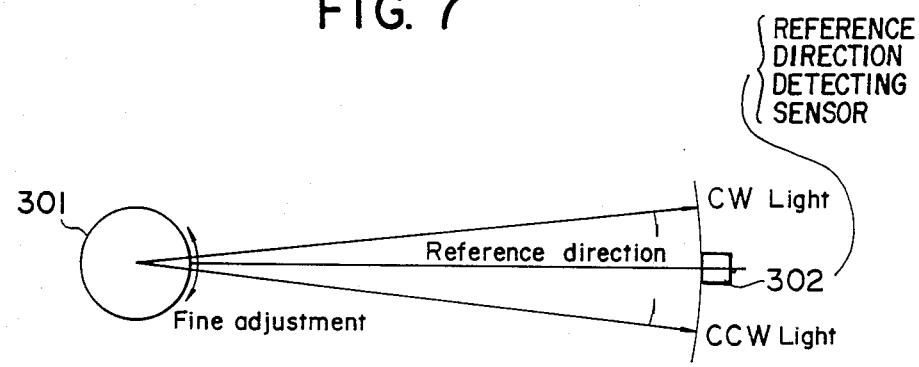
FIGS. 7 and 8 show the layout of an object axis detecting sensor and its circuit diagram.
Figure 8:
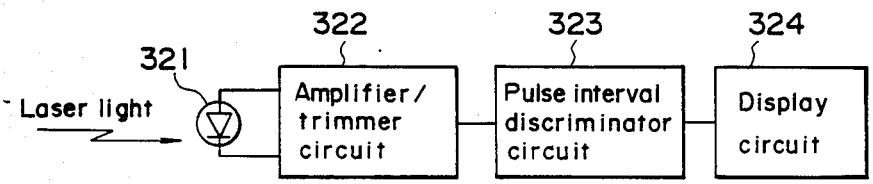

A reference direction detecting sensor 302 is detailed in FIGS. 7 and 8. Referring to FIG. 7, laser beams CW, CCW are simultaneously received in the reference direction. Therefore, such simultaneous receiving of said two laser beams is detected while finely adjusting the angle of installation for laser device 301. FIG. 8 shows the circuit of a reference direction detecting sensor which comprises a phot diode 321, an amplifier/trimmer circuit 322, a pulse interval discriminating circuit 323 and an indicating circuit 324. Said sensor detects laser beams using the photo diode and, when time interval for receiving laser beams CW, CCW is smaller than a permissible limit time, the laser beams are displayed.

Figure 9:
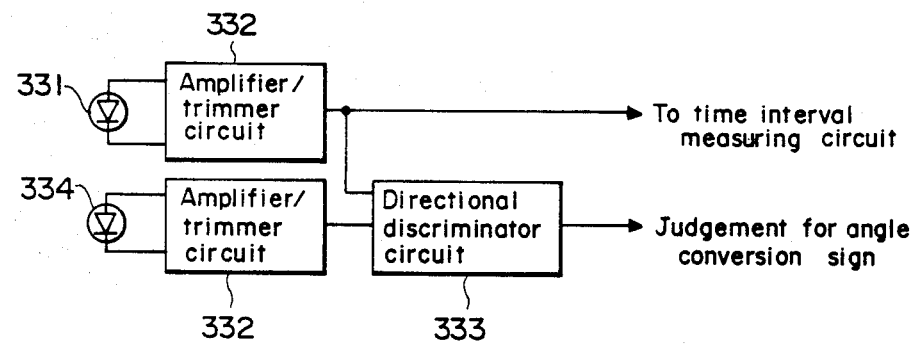
FIG. 9 indicates the circuit diagram of a measuring point sensor.

FIG. 9 shows a measuring point sensor 303 comprising photo diodes 331, 334 for time measurement and direction discrimination, amplifier/trimmer circuits 332, 332 and a direction discriminating circuit 333. Photo diodes 331, 334 are slightly separated in a plane to identify laser beams CW and CCW, thereby discriminating whether CW or CCW is received according to the order of receiving the laser beams. Sensors for laser devices 301A and 301B are identified by installing at different heights from the ground surface.

Figure 10:
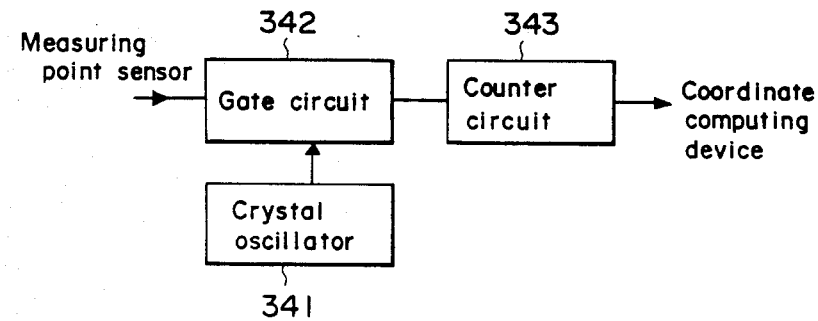
FIG. 10 is a light receiving interval measuring circuit diagram.

A light receiving time measuring circuit 304 is shown in FIG. 10, said circuit 304 comprising a crystal oscillator circuit 341, a gate circuit 342 and a counter circuit 343.

A microcomputer can be used as a coordinate computing display device 305. The coordinates of a measuring point are converted to orthogonal or polar coordinate system, etc. by means of said device 305, thus the coordinates of previous measuring point can be displayed or moving direction of the measuring point can be displayed by entering beforehand coordinates to be obtained.

Figure 11:
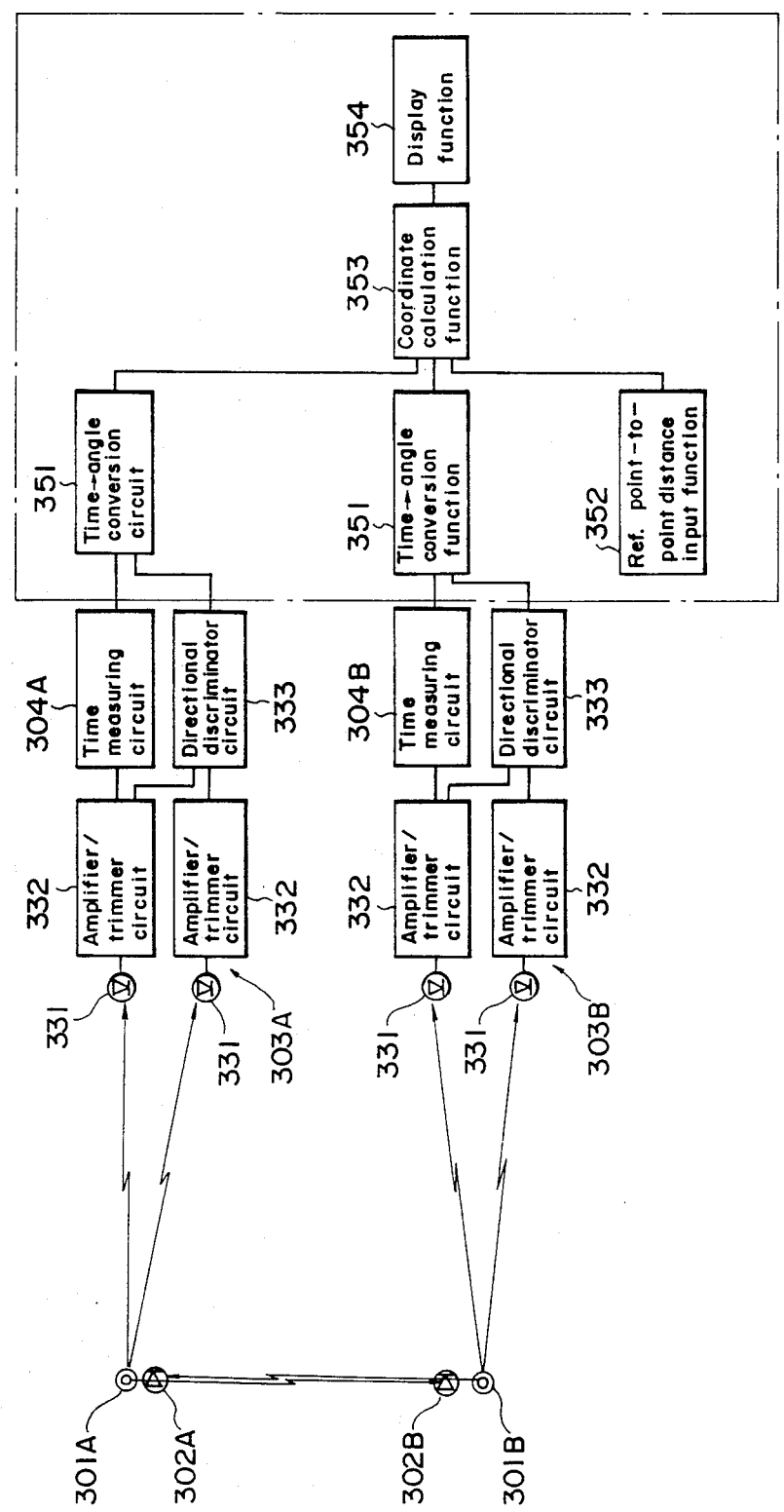
FIG. 11 showing a general functional view.

FIG. 11 shows a general functional view of the entire equipment. Symmertrical axis detecting sensors 302A, 302B, are located at laser devices 301A, 301B. The installation angle of laser devices 301A, 301B are finely adjusted by said sensors 302A, 302B, so that the symmetrical axis of laser beams CW, CCW aligns with the direction (reference direction) of reference points A, B. Laser devices 301A, 301B rotate at a uniform rotating velocity while irradiating laser beams CW, CCW. Laser beams CW, CCW are detected by photo diodes 331, 331 of measuring point sensors 303A, 303B, respectively, thereby signals of detection are entered in amplifier/trimmer circuits 332, 332 and direction discriminator circuit 333 where the sign of angle conversion is judged. In addition, time intervals for receiving laser beams CW, CCW are measured by means of receiving light interval measuring circuits 304A, 304B. A coordinate computing display device 305 is provided with a time-/angle converting facilities 351, 351 which calculate the angle between reference line (symmetrical axis of oppositely rotating laser beams CW, CCW) and measuring point C, referring to time intervals for receiving laser beams CW, CCW. A coordinate computing facility 53 calculates the coordinates of measuring point C, while displaying the result on displaying facility 54, referring to the value of said angle and distance l between reference points, as entered in reference points distance input facility 52.

According to the method and device of detecting angle using laser based on the present invention, the laser devices for rotatingly irradiating laser light should be capable to irradiate oppositely rotating two laser beams. Therefore, the structure of the laser devices becomes slightly complicated. However, their cost does not become very high in total because a radio device is used for communicating the measuring and reference points. In addition, conventionally encountered measuring errors due to error operations of the radio system can now be avoided. The advantages obtained by the present invention are summarized as follows.

(1) One-man survey becomes possible. (2) Measurement can be performed at a free position on the plane. (3) Several measuring points can be measured at the same time. (4) Measurement is instantaneous. (5) Moving measurement is applicable. (6) Operation is simple not requiring skills. (7) High accuracy is assured for the measurement. (8) The equipment is small, light and low-cost. (9) A maximum measuring range is about 300 m. (10) Data can be automatically recorded or entered in computer.

Practical applications, available for the system based on the present invention, include normal surveying, positional measurement for mobile robot and control.

Next, a device of the present invention for creating oppositely rotating two laser beams is described in the following referring to FIGS. 12 through 19.

Figure 12:
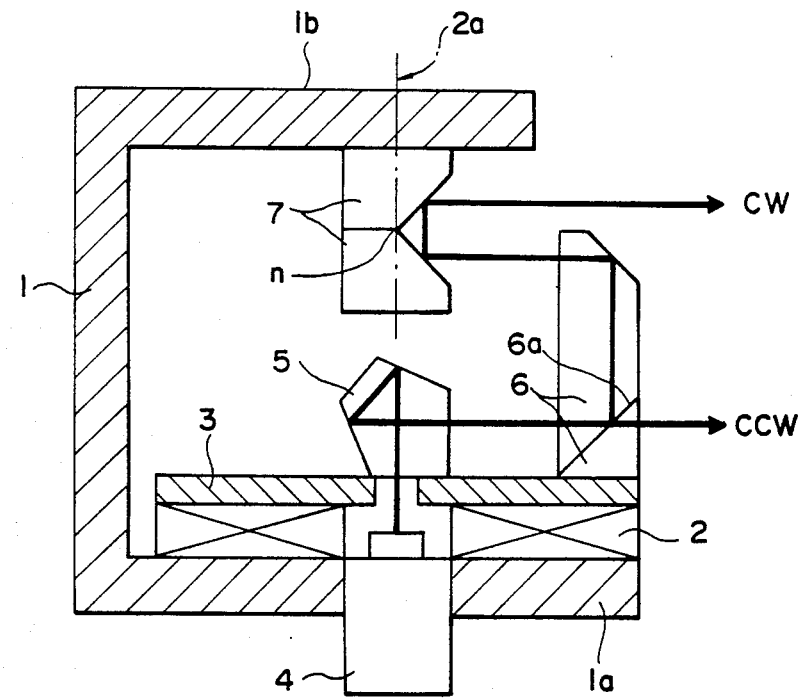
FIGS. 12 and 13 illustrates a laser device for irradiating two laser beams that rotate in opposite angular directions, in front and plan views, respectively.
Figure 13:
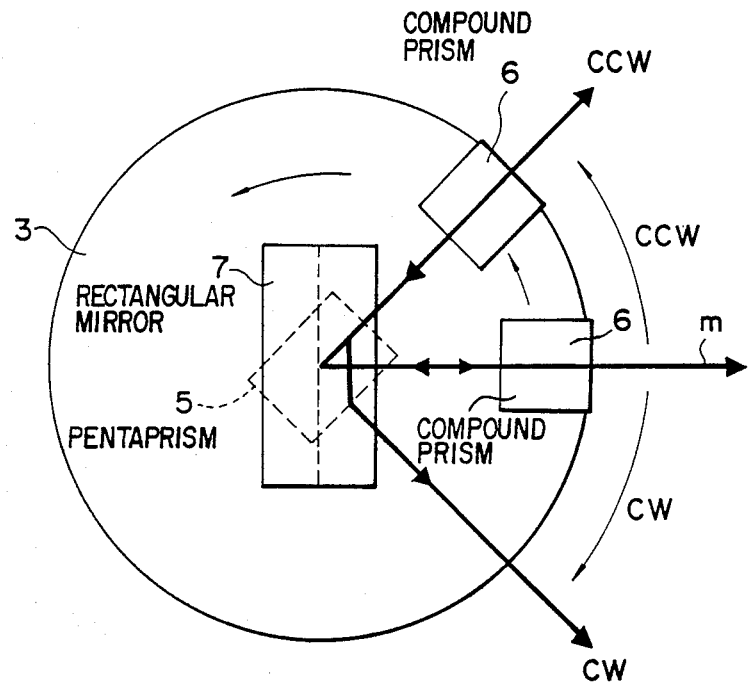

Referring to FIGS. 12 and 13, the device based on this invention is provided with a mounting rack 1 which shows a substantial C shape in the side elevation. On lower horizontal part 1a of said rack 1, a rotating base 3 is equipped and rotated by motor 2 which revolves at uniform speed with a perpendicular rotating axis. Rack 1 is provided with a laser oscillator 4 on rotating axis 2a of motor 2.

A pentaprism 5 is mounted at the center of rotating base 3 on which a compound prism 6 is mounted in the direction of optical axis for pentaprism 5. In upper horizontal part 1b of mounting rack 1 (fixed part), a rectangular mirror 7 is installed. In intersection n of said rectangular mirror intersects with rotating axis of the motor (optical axis of laser) 2a in rectangle.

Figure 14A:
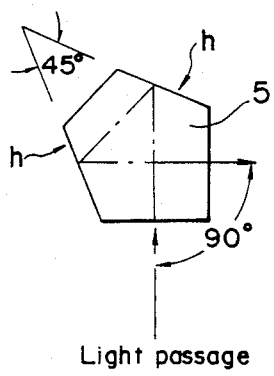
FIG. 14A shows the side view of the pentaprism.
Figure 14B:
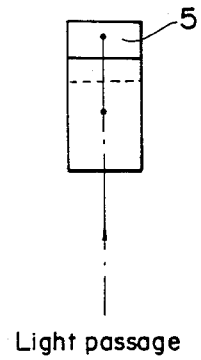
FIG. 14B is a front view, while FIG. 14C showing a side view in which mounting errors are canceled in the passage of laser light.
Figure 14C:
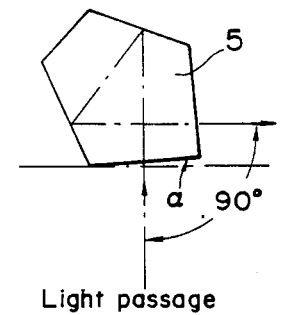
Figure 15A:
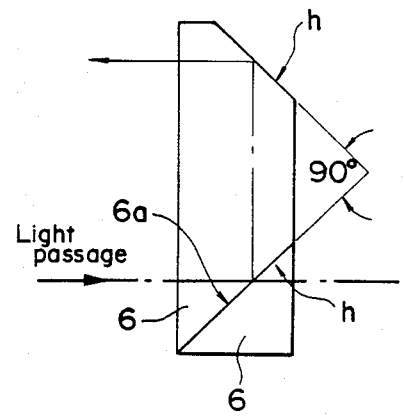
FIG. 15A is a side view of the compound prisim.
Figure 15B:
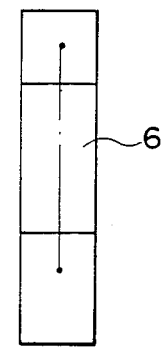
FIG. 15B is a front view of the compound prism.
Figure 16A:
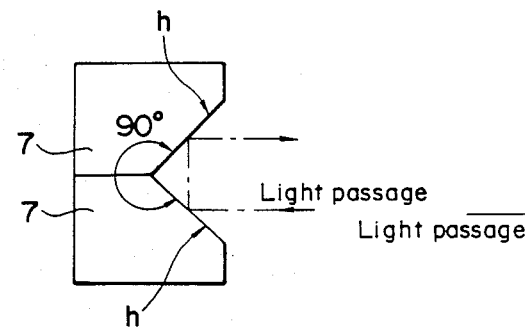
FIGS. 16A and 16B illustrate the side and front views of the rectangular mirror, respectively.
Figure 16B:
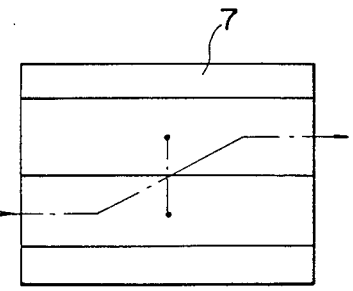

FIGS. 14 through 16 show pentaprism 5, compound prism 6 and rectangular mirror 7. Pentaprism 5 has two reflective surfaces h with an intersecting angle of 45 degrees between the surfaces. Compound prism 6 has two reflective surfaces with an intersecting angle of 90 degrees as shown in FIGS. 15A and 15B. One surface is structured as a beam splitter 6a. Rectangular mirror 7 is provided with two reflective surfaces h having an intersecting angle of 90 degrees. As motor 2 rotates, rotating base 3 revolves clockwise together with pentaprism 5 and compound prism 6 rotating at specified velocities without irregularities. Laser beam, emitted from laser oscillator 4, is bent 90 degrees by pentaprism 5. Laser beam, evolved from pentaprism 5, is splitted into two beams by compound prism 6. One component of splitted laser beam proceeds outwardly as laser beam CCW that rotates counterclockwise, out of oppositely rotating laser beams. The other component of splitted laser beam is bent 90 degrees by beam splitter 6a and then bent further 90 degrees thereby returning to the center of rotation.

The laser beam, returned to rotation center, is reflected as laser beam CW that rotates clockwise out of two oppositely rotating laser beams, by means of rectangular mirror 7. Thus, two oppositely rotating laser beams can be obtained. In FIG. 13, m represents the symmetrical axis of the laser beams. FIG. 14C shows an aspect where mounting error $\alpha$ is canceled at pentaprism 5.

Figure 17:
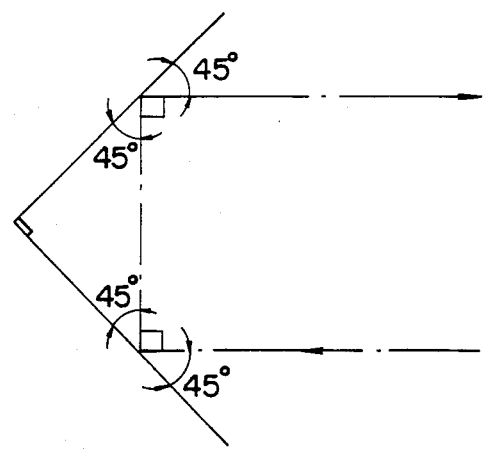
FIGS. 17 through 19 show the inversion of laser light by being reflected at the rectangular mirror, in terms of side, bird-eye top plan views, respectively.
Figure 18:
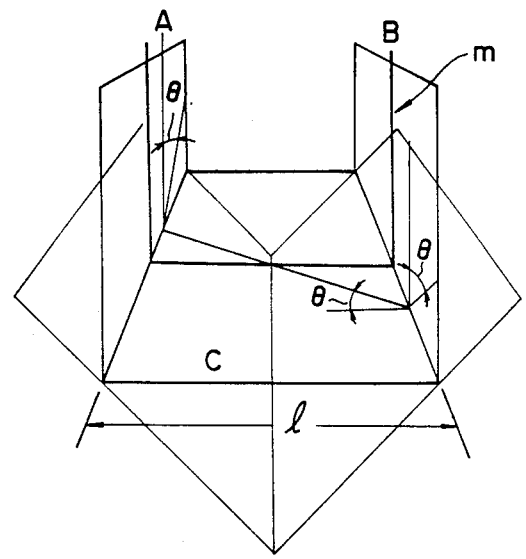
Figure 19:
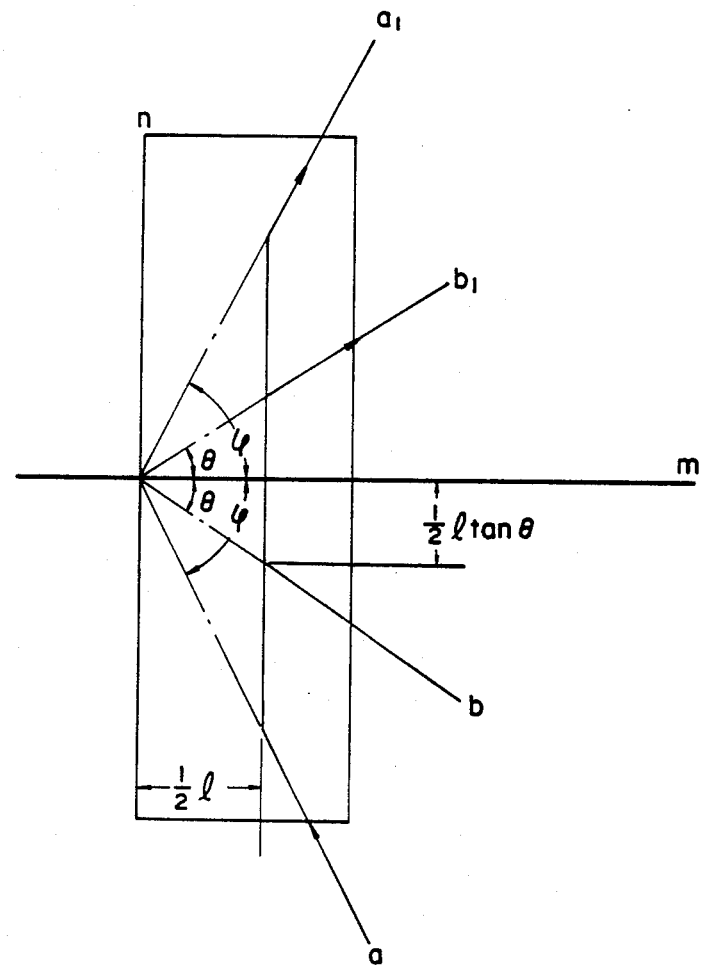

FIGS. 17 through 19 show the status where the laser beams are reversed by the reflection at the rectangular mirror. Referring to FIG. 17, the laser beam keeps an incident angle of 45 degrees to the mirror. In FIG. 18, the laser beam passed optical passage planes A, B and C, where A//B, A⊥C and B⊥C hold valid. The laser beam, incident with an angle $\theta$ to symmetrical axis m in plane B, holds an angle 0 to symmetrical axis m in plane A. Referring to FIG. 19, the laser beam is reflected in symmetry at a virtual reflecting point on mirror intersection n, when the mirror is viewed from upper part.

The laser beam is bent 90 or 180 degrees at prisms 5, 6 and mirror 7. However, the beam is reflected twice in prisms 5, 6 and mirror 7. Therefore, the mounting errors of the prisms and the mirror are canceled for bending laser beams by 90 or 180 degrees. Of course, the deflection of the axis with motor 2 is also canceled.

Figure 20:
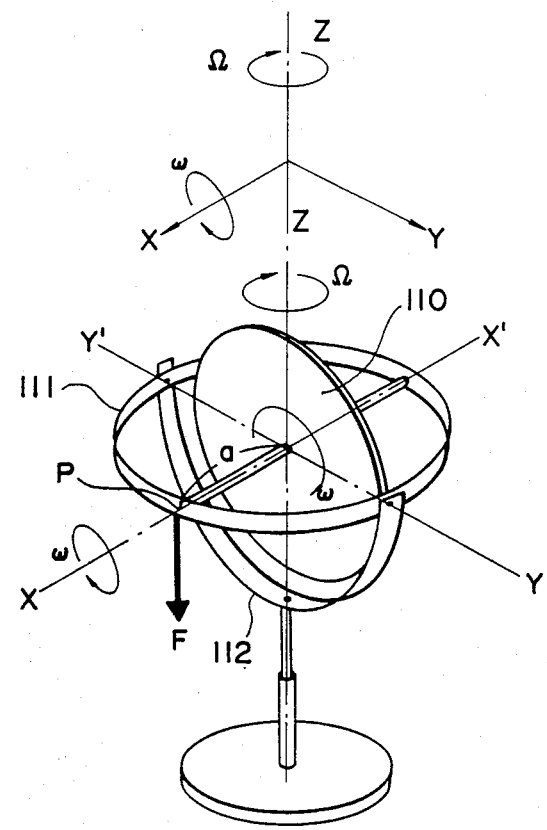
FIG. 20 is a skewed view of a gyro for explaining the principle of precession for the gyro as a basic concept of the operation for the laser device for rotatingly irradiating laser light according to the present invention.
Figure 21:
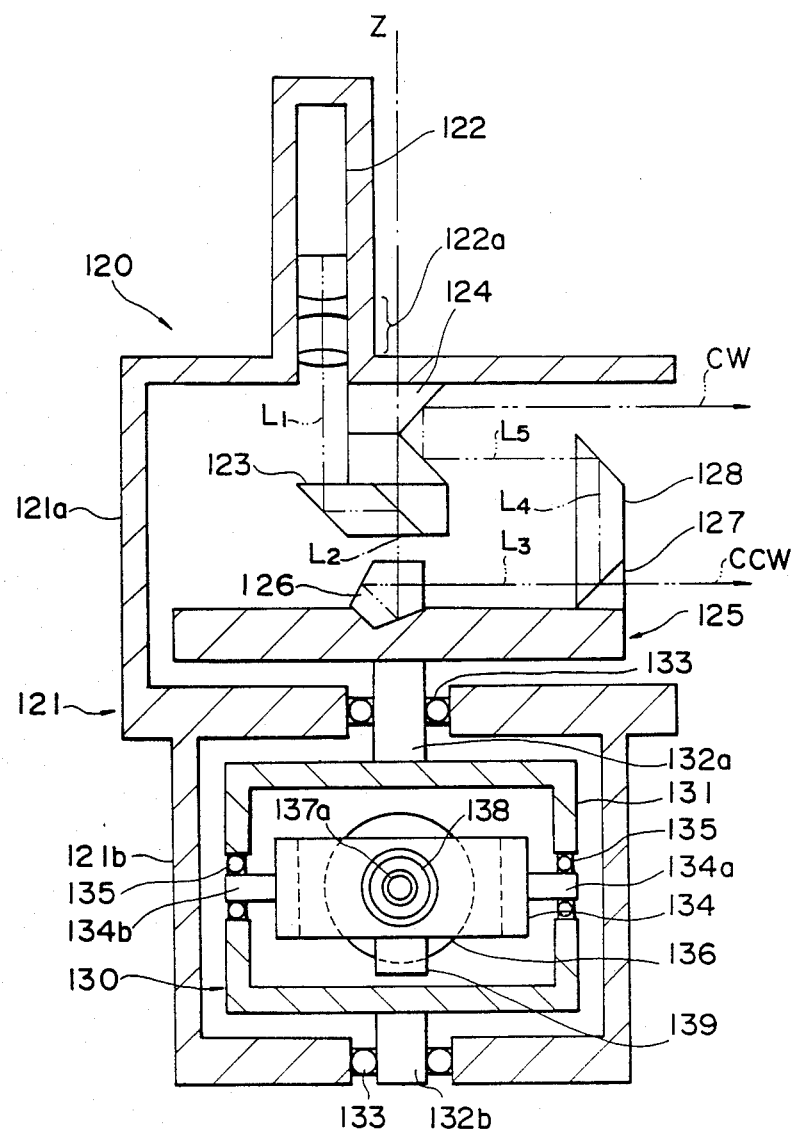
FIG. 21 shows a side section of one embodiment of said laser device for rotatingly irradiating laser light.

Then the laser device for rotatingly irradiating laser light of the present invention is described referring to FIGS. 20 and 21.

First referring to FIG. 20, the principles of the laser device of the present invention are detailed.

The inventors have found that the principle of precession for gyro could advantageously apply to this type of laser device for rotatingly irradiating laser light as a result of various study works. A fundamental form of gyro is shown in FIG. 20 in which rotor 110 rotates at a high speed around its rotating axis X X', while said rotating axis X X' being supported by a horizontal gimbals 111 which is retained by a vertical gimbals 112. Horizontal gimbals 111 can rotate around axis Y Y', while vertical gimbals 112 revolving around axis Z. Under idealistic state (there are complete dynamic balance for rotor 110 and static balance for each gimbals 111, 112 with completely zero friction losses to air resistance and friction at the bearings of axes X, Y and Z), rotor 110 continues permanentely to orient a certain direction in space, that is, keeps gyro rigidity.

Where force F applies to point P on rotor rotating axis X of horizontal gimbals 111 in the above, point P is not driven downward but the entire assembly begins to rotate around gimbals axis Z of vartical gimbals 112 at a constant angular velocity while horizontal gimbals 111 maintaining horizontal state. Accordingly, gimbals axis Z is rotated by horizontal gimbals 111 according to a basic principle which is called the general rule of precession (perturbation).

More explicitly, where a couple force aF (a represents a distance between axis Y Y' and point P) applies around horizontal gimbals axis Y Y', horizontal gimbals 111 begins to rotate around vertical gimbals axis Z at an angular velocity $\omega$. At that time $$aF = I\omega\Omega$$

(where I=inertia moment of rotor 10 $\omega$=roraring velocity of rotor 10) holds valid. By solving the equation above for $\Omega$, we have $$\Omega = aF/I\omega \quad (1)$$

Where couple force aF applies by means of a weight in the above, $\Omega$ becomes inversely proportional to $\omega$ because of constant aF and I. Accordingly, rotating irregularities of $\Omega$ are inversely proportional to $\omega$. An important parameter required for the laser device for rotatingly irradiating laser light is the integrated errors of rotation with horizontal gimbals 111 through one cycle of rotation. Such integrated errors are apt to become inversely proportional to the square of the number of rotations for horizontal gimbals 111. Therefore, the larger the angular velocity $\Omega$ of horizontal gimbals 111, the less the errors due to rotation irregularities are resulted advantageously. However, angular velocity $\Omega$ cannot be made excessively large because of other restrictions. Therefore, $\omega$ is made larger and controlled to a constant value by using the characteristics of equation (1), thereby rotation irregularities can be made extremely small even with rather small $\Omega$.

Laser device for rotatingly irradiating laser light 120, shown in FIG. 21 and based on the present invention, is rotated on the basis on foregoing operation principles. Referring to FIG. 21, the laser device for rotatingly irradiating laser light is shown by 120 in entirety, including device base 121. Device base 121 comprises upper part 121a and lower part 121b, where one horizontal direction of upper part 121a is closed while both sides of lower part 121b being closed in a direction vertical to the paper face. A laser oscillator 122 is erectedly mounted on upper part 121a, said oscillator 122 irradiating laser light $L_1$ in downward direction from collimator lens 122a. Laser light $L_1$ is bent twice by 90 degrees each at prism 123, thus being projected in the direction of vertical axis Z as laser light $L_2$. Prism 123 is integratedly coupled on the lower face of fixed mirror 124. Laser light $L_2$, projected in the direction of vertical axis Z, enters pentaprism 126 located on the rotating axis of rotating base 125 (i.e., vertical axis Z), then twice reflected in said prism 126 becoming laser light $L_3$ emitted in horizontal direction. At that time, said rotating base 125 is revolved counterclockwise around vertical axis Z of device base 121. Laser light $L_3$ enters a beam splitter 127 mounted in the outskirt of rotating base 125, being splitted into laser beam CCW projected horizontally and laser light $L_4$ emitted vertically to the above. Laser light $L_4$ passes a prism 128 integratedly coupled onto the upper face of beam splitter 127, then reflected toward fixed mirror 124 as laser light $L_5$. Fixed mirror 124 is mounted on the upper interior of upper part 121a of device base 121. Said mirror reflects laser light $L_5$, coming from prism 128, twice by 90 degrees each, thus irradiated as laser beam CW that goes horizontally. On the other hand, a gyro, shown by 130 in entirely, is provided in lower part 121b of device base 121. Vertical gimbals 131 of gyro 130 is rotatably supported on device base 121 by means of gimbals axes 132a, 132b on vertical axis Z through bearings 133, 133. Gimbals axis 132a is coupled onto rotating base 125. In other words, the rotating axis of rotating base 125 is coupled to gimbals axis 132a. A horizontal gimbals 134 is supported by vertical gimbals 131 rotatably onto gimbals axes 134a, 134b through bearings 135, 135. A gyro rotor 136 is supported on horizontal gimbals 134 rotatably by means of rotor rotating axes 137a, 137b (137b is not illustrated) through bearings 138, 138 (the other 138 is not illustrated). A precession weight 139 is mounted in the lower part of one bearing 138 of horizontal gimbals 134. Said gyro rotor 136 is driven by a speed controlled motor (not illustrated) for high-speed rotation at an angular velocity of $\omega$, said motor being energized through a slip ring not illustrated.

During operation, couple force aF acts onto horizontal gimbals 134 by means of a precession weight 139 as shown in FIG. 20. Therefore, horizontal gimbals 134 rotates in small irregularities at an angular velocity of $\Omega$ around vertical gimbals axes 132a, 132b under the principles of precession. Rotation irregularities are inversely proportional to a high-speed rotating angular velocity $\omega$ of gyro rotor 136 shown in equation (1). Accordingly, the irregularities are extremely small even with rather low rotating angular velocity of $\Omega$.

On the other hand, laser light $L_1$, emitted from laser oscillator 122, is splitted into laser beam CCW, rotating counterclockwise, and laser light $L_4$ by means of a beam splitter 127 located on a rotating base 125 that revolves counterclockwise. Laser light $L_4$ is reflected 90 degrees at a prism 128 and then reflected twice by 90 degrees each by means of fixed mirror 124, resulting in a laser beam CCW that rotates clockwise, which is irradiated from laser device 120.

These laser beams CCW and CW are irradiated from laser device 120, rotatingly in small rotating irregularities because the rotating irregularities of rotating base 125 are very small. As a result, measuring accuracies are greatly improved.

As described above, the rotating base is rotated according to the principle of gyro precession with the laser device based on the present invention. Thereby, two horizontal laser beams, rotating counterclockwise and clockwise at the same angular velocity with very small rotation irregularities, are irradiated. As a result, measuring accuracies can be greatly improved.

The method and device for measuring an angle in 3-D space, according to the present invention, are described next in the following referring to FIGS. 22 through 26.

According to the method and device for measuring an angle in 3-D space based on the present invention, a reference direction detecting sensor is used to correct reference line connecting two reference points. A laser beam detecting sensor can be composed of a photo diode, a amplifier/trimmer circuit, a threshold value circuit, etc. A time measuring device, for measuring time intervals for receiving laser beams, can be comprised of a crystal oscillator circuit, a gate circuit, a counter circuit, etc. A computing device can be constructed with a microcomputer. These devices are shown only as blocks in the following embodiment because the details of these devices are already known in the state of the art and can be selected freely.

Figure 22:
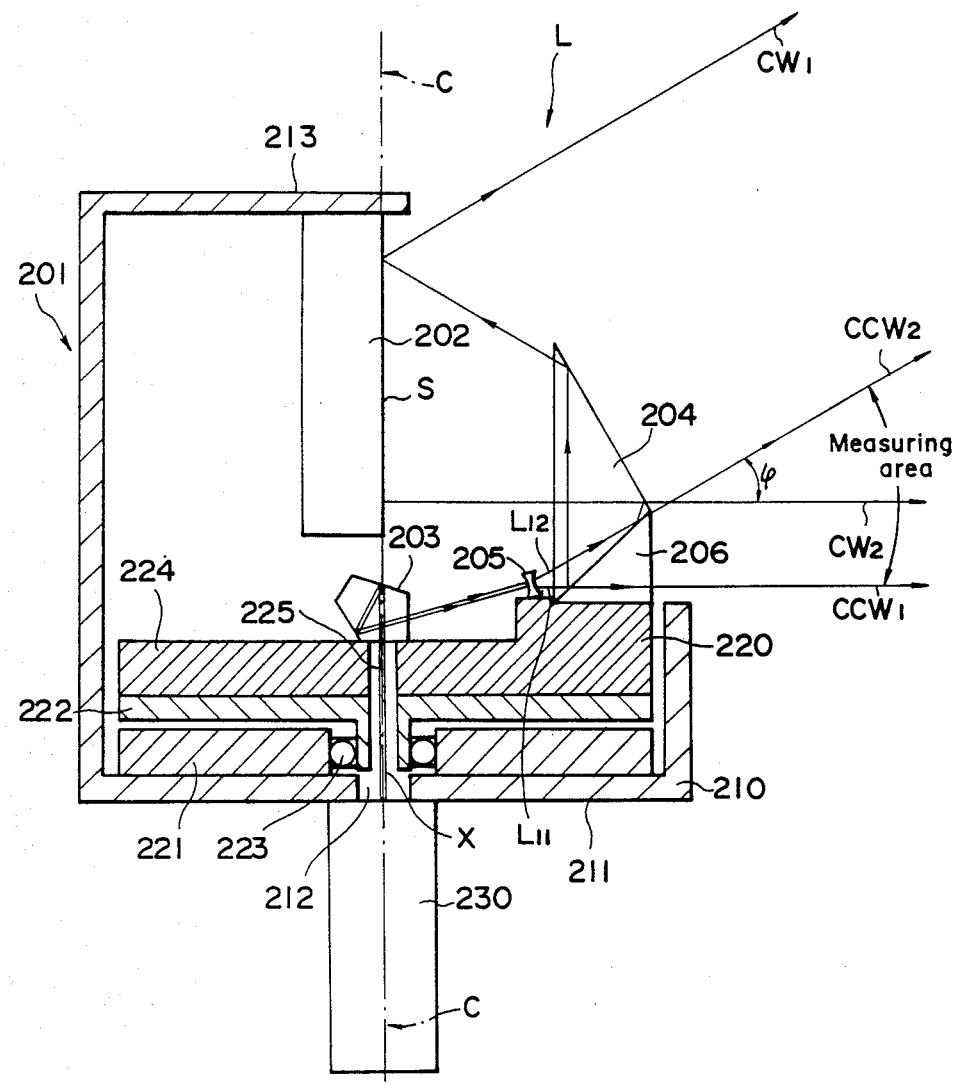
FIG. 22 is a side view that shows one embodiment of the laser device for rotatingly irradiating laser light, used for measuring an angle in 3-D space, according to the present invention.
Figure 23:
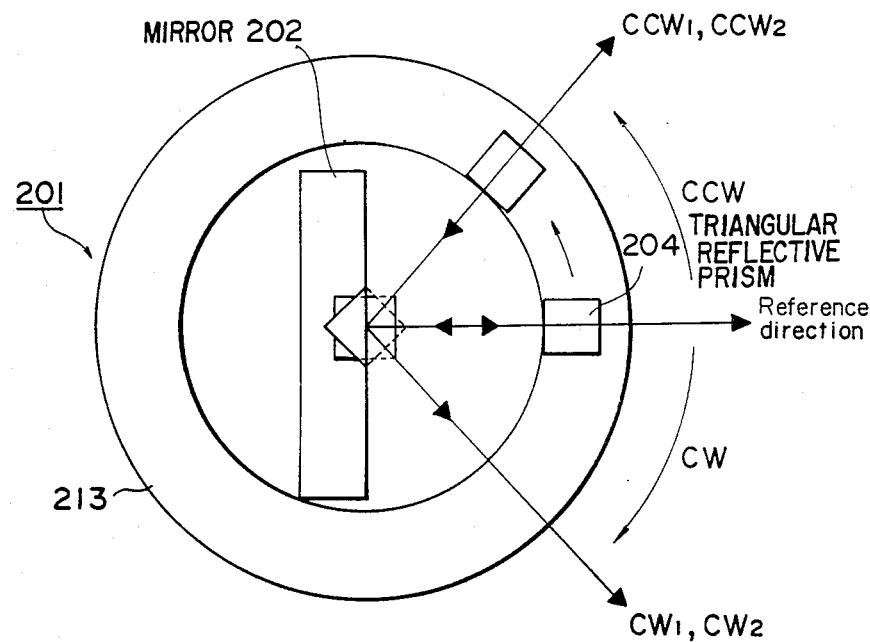
FIG. 23 is a typical plan view for said laser device.
Figure 24:
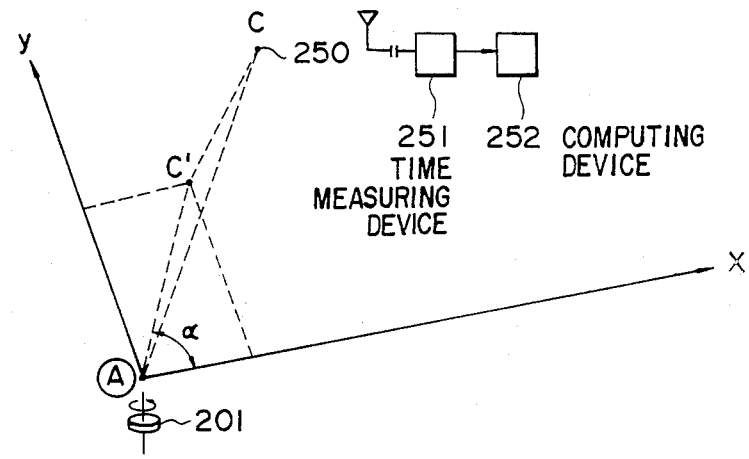
FIGS. 24 and 25 indicating different measuring methods.

Referring to FIGS. 22 and 23, a description is given regarding an embodiment of a laser device for rotatingly irradiating laser light used for a method and a device for measuring an angle in 3-D space according to the present application.

Referring to FIG. 22, laser device 201 comprises a fixed housing 210, a rotating base 220 mounted in said housing and various optical devices to be detailed later and mounted in housing 210 and rotating base 220.

Fixed housing 210 is structured substantially in a box shape, in which a laser oscillator 230 is fixed at the center of its bottom wall 211. Laser light X, irradiated from this oscillator, passed center hole 212 and reaches the interior of the housing. Fixed housing 210 is provided with a bearing member 213 in its upper part in an integrated manner. This bearing member 213 is equipped with a fixed mirror 202 so that a reflective face S aligns with rotating center line C.

A stator 221, a component of the motor, is provided in fixed housing 210. Opposite to this stator 221, a plate rotor 222 is supported rotatably by means of bearing 223. A rotating base 224 is integratedly mounted on this rotor 222. A through-hole 225 is formed at the center of rotating base 24. Laser light X, emitted from laser oscillator 230, passes this through-hole 225 and reaches a pentaprism 203 fixed on rotating base 224.

Pentaprism 203 is fixed at the center of rotating base 224 as described above, together with a triangular reflective prism 204 and a beam splitter 206 located in the outer periphery of rotating base 224. In addition, a cylindrical concave lens 205 is equipped integratedly at an intermediate position of rotating base 224 so that the center axis is directed tiltingly upward. Therefore, when rotating base 224 revolves, an integrated assembly of prism 203, cylindrical concave lens 205, reflective prism 204 and splitter 206 is rotated altogether.

Laser device for rotatingly irradiating laser light 201 is structured as described in the above. Laser light X, emitted from laser oscillator 230, is reflected at pentaprism 03 as shown in FIG. 22, reaching cylindrical concave lens 05. At cylindrical concave lens 205, the laser light is diffused only in the up/down direction as shown in FIG. 22. The first edge of light $L_{11}$ is, in part, projected straightly through beam splitter 206 resulting in laser beam $CCW_1$. The balance light is reflected at a reflective prism 204 and then a mirror 202, thus becoming laser beam $CW_1$. The second edge of laser light $L_{12}$ is, in part, straightly projected through reflective prism 204 and beam splitter 206, resulting in beam $CCW_2$. The balance laser light is deflected at reflective prism 204 and then reflected at mirror 202, thus becoming laser beam $CW_2$.

Laser beams, passing through concave lens 5 and passing or being reflected at the prisms, mirror, etc., are diffused in endless sectors between $CCW_2$ and $CCW_1$ and between $CW_1$ and $CW_2$, while being irradiated in skewedly upper direction. Therefore, if there is a measuring point within a range of angle $\phi$ in FIG. 22, the point is irradiated by the two types of laser beams CW, CCW. When rotating base 220 is then rotated counterclockwise viewed from the upper side, laser beams $CCW_1$, $CCW_2$ revolve also in the same direction as the rotating base. However, beams $CW_1$, $CW_2$ are reflected at mirror 202, therefore revolved clockwise, opposite to laser beams $CCW_1$, $CCW_2$. The relationship of these rotation directions is shown typically in FIG. 23.

The laser beams are irradiated as described above. Therefore, where there is a measuring point in the measuring area shown in FIG. 22, the point is irradiated by both counterclockwise beam CCW and clockwise beam CW. Accordingly, the angle or direction of the measuring point can be calculated by measuring time intervals as described referring to FIGS. 27 through 30.

In addition, the angle of a measuring point outside the measuring area can also be calculated by providing a sensor for receiving counterclockwise beam CCW and a sensor for receiving clockwise beam CW. A method of the measurement is described referring to FIG. 24. Reference point A is determined on the x, y plane, in which laser device 201 is mounted at reference point A so that its rotation center agrees with axis Z, thereby laser light is irradiated. A laser light detecting sensor 250 is mounted at measuring point C for detecting laser beams. In addition, a time measuring device 251 and a computing device 252 are also provided.

When laser beams are irradiated as described in the above, sensor 250 detects beams CCW and CW. Then the signal of detection is entered in the time measuring device which measures time intervals $t_1$, $t_2$, $t_1$, $t_2$, ... as already explained referring to FIG. 30. Consequently, computing device 252 calculates an angle $\alpha$ between measuring point C and reference line AB using these time intervals $t_1$, $t_2$ by the following equation.

$$\alpha = \frac{t_1 - t_2}{|t_1 - t_2|} \times \frac{t_2}{t_1 - t_2} \times 180°$$

Figure 25:
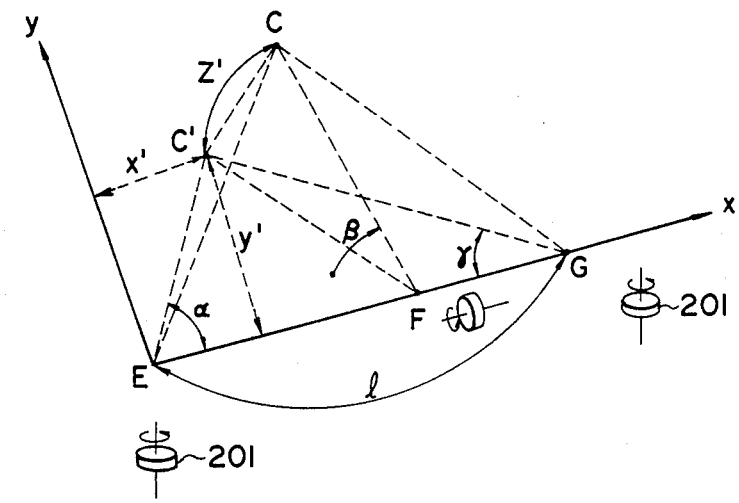
Figure 26:
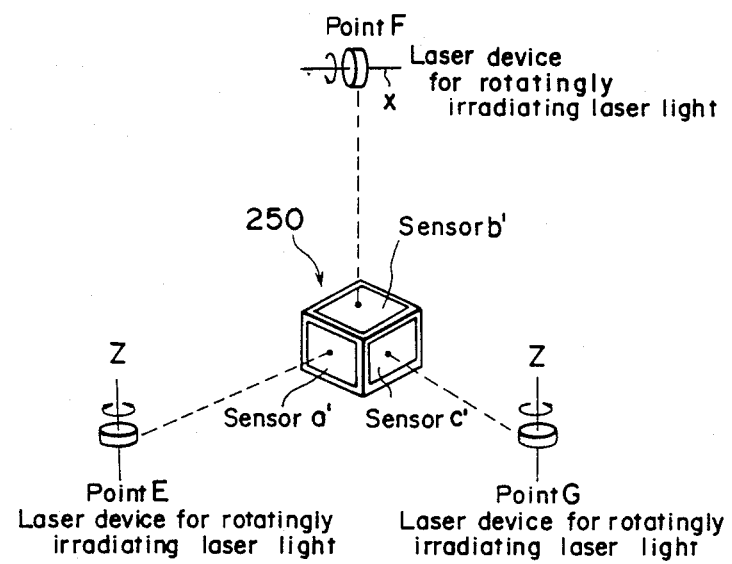
FIG. 26 is a typical skewed view for showing an embodiment of the laser light detecting sensor.

The position of a measuring point in 3-D space can also be measured by the principles of the present invention. Referring to FIG. 25 for example, laser devices 201 are installed at reference points E, G on axis x so that the rotation center agrees with axis x, thereby angles $\alpha$, $\gamma$ are measured. Distance 1 between reference points E, G is obtained beforehand. Therefore, the x, y axis coordinates of C' (x', y') is calculated by computing device 252 (FIG. 24) with given two angles and one side. Then, an angle $\beta$ is calculated by the laser device installed at reference point F. while also computing the coordinates of axis Z and coordinates (x', y', z') at measuring point C. These calculated values can be indicated on the display or printed out.

Where laser beams are irradiated from three reference points as described above, laser beam detecting sensor 250 should be structured to be capable to identify the beams. An embodiment of such a structure is shown in FIG. 26. Sensor 250 comprises a photo diode, etc. Three sensors 250 (a', b', c') are provided to match the three laser devices installed at different points. Each sensor a', b'or c'can receive only respective laser beam coming from each reference point E, F or G. Although not illustrated in detail, the wavelength of laser emitted from each laser device may also be changed for discrimination using an optical filter. Another method of applicable discrimination is to change the rotation frequency of the laser device and to identify using a microcomputer.

According to a method and a device for measuring an angle in 3-D space based on this invention as described above, laser beams are expanded in endless sectors providing a wide range of measurement. Therefore, the angle of a measuring point, resident in 3-D space, can be easily measured. In addition, the angle of a moving measuring point can also be measured by virtue of laser beams formed in sectors. Furthermore, laser light in use allows instantaneous measurement together with easy indication and recording of measured data.

The present invention will not be restricted to the

The present invention will not be restricted to the illustrated embodiments but it should be noted that various versions and modifications can be accomplished within the scope of the attached claims for a patent.

A method and a device of measurement, according to the present invention, comprises the foregoing configuration. Referring to FIG. 1, an angle is calculated by $$\theta = \frac{t_1 - t_2}{|t_1 - t_2|} \times \frac{t_2}{t_1 - t_2} \times 180°$$

where $t_1$ represents a time interval from detecting laser light rotating counterclockwise to detecting laser light rotating clockwise at the measuring point, and $t_2$ denotes a time interval from detecting laser light rotating clockwise to detecting laser light rotating counterclockwise.

With a device for generating oppositely rotating laser beams according to the present invention, a prism and a mirror are used to reflect the direction of the laser beam by 90 degrees or 180 degrees. At that time, the laser beam is reflected twice in the prism and the mirror. Accordingly, mounting errors of the prism and the mirror, if any, are canceled when the laser beams pass the optical passages. Therefore, two oppositely rotating laser beams can be generated in extremely high accuracies.

The laser device for rotatingly irradiating laser light based on the present invention is invented on the basis of the precession principles. Therefore, by applying force couple by means of precession weight, the rotating base axis. As a result, measuring accuracies can be improved. Furthermore, the sensor can easily detect laser light while .also easily obtaining 3-dimensional (3-D) angle by means of the angle measuring device of the present invention in 3-D space, because said laser light sectors are used for obtaining the point of intersection. Therefore, the sensor can easily detect the light for easily obtaining a 3-D angle. Where there is a moving object, for example, its 3-D directions can be ascertained by attaching a sensor in the object. As described above, the sensor can easily detect laser light by using laser light sectors, extremely advantageous for measuring an angle.

What is claimed is:

1. A method of detecting an angle using a laser, comprising the steps of: mounting a laser device for irradiating at least two laser beams at a reference point, rotating said two laser beams in opposite angular directions at a constant and non-fluctuating angular velocity, detecting said laser beams, and measuring precise time at a measuring point which forms a first line between said reference point and said measuring point, wherein said step of measuring time measures time intervals between detections of said laser beams which rotate in opposite angular directions, and entering said time intervals in a computing device that calculates an angle between said first line and a reference line, wherein said step of mounting a laser device comprises the step of mounting at least one prism means for splitting a laser beam from a laser oscillator means and for projecting said two laser beams which rotate in opposite angular directions.

2. A device for detecting an angle using a laser, comprising a laser device for rotatingly irradiating at least two laser beams in substantially parallel horizontal planes, said laser device being placed at a reference point, a measuring point sensor for detecting said laser beams, said sensor being placed at a measuring point which forms a first line between said reference point and said measuring point, a time measuring device for measuring time intervals between detections of said laser beams and an angle computing display device that calculates an angle between a symmetrical axis of said two laser beams and said first line and then displays said angle, wherein said laser device has at least one prism means for splitting a laser beam from a laser oscillator means and for projecting said two laser beams which rotate in opposite angular directions.

3. A device for generating at least two laser beams that rotate in opposite angular directions at the same angular velocity, comprising a pentaprism placed at the center of a rotating base that is rotated, by a motor having a shaft rotating at a non-fluctuating velocity, on a plane, a laser oscillator placed on the rotation axis of said motor, a laser beam emitted from said laser oscillator being deflected by substantially 90 degrees by means of said pentaprism, a compound prism being placed in the direction of an optical axis of said pentaprism on said rotating base, said compound prism having a beam splitter and at least two rectangular reflective surfaces, a laser beam emitted from said pentaprism being divided into at least two components, one of said at least two components being projected outwardly as a beam of said at least two laser beams, the other of said at least two components being returned to the center of rotation, a rectangular mirror being placed on a mounting rack so that an an intersecting portion of said mirror crosses the rotation axis off said motor, and said rectangular mirror reflecting the laser beam returned to the rotation center by means of said compound prism as the other beam of said at least two laser beams to thereby obtain said at least two laser beams that rotate in opposite angular directions at the same angular velocity.

4. A laser device for rotatingly irradiating laser light, which is used in an angle detecting device using laser, comprising a laser device that is placed at a reference point for measurement and irradiates at least two laser beams rotating in opposite angular directions in substantially parallel horizontal planes, a measuring point sensor means for detecting said at least two laser beams at a measuring point, a time measuring means for measuring time intervals between detections of said laser beams, and an angle computing and displaying device, comprising a laser oscillator, a rotating base for dividing a laser light emitted from said laser oscillator into a beam in a first direction and the other beam in a second direction opposite to said first direction, a fixed mirror for reversing said laser beam divided in said second direction by substantially 180 degrees, the rotation axis of said rotating base being connected to the vertical gimbals axis of a gyro and a precision weight mounted on at least one of two intersections between a horizontal gimbals axis and the rotation axis of a gyro rotor.

5. A method of measuring at least a 3-dimensional angle by using a laser, comprising the steps of: rotatingly irradiating at least two laser light sectors in opposite angular directions at the same angular velocity at a reference point, detecting laser beams emitted from a laser device at a measuring point which forms a first line with said reference point, and detecting time intervals between detections of laser beams emitted from said laser device and rotated in opposite angular directions, measuring and entering said time intervals in a computing device that calculates an angle between said first line and a plane containing a reference line, wherein said step of rotatingly irradiating at least two laser light sectors includes the step of mounting at least one prism means for splitting a laser beam from a laser oscillator means and for projecting said at least two laser light sectors which rotate in opposite angular directions.

6. A device for measuring an angle in 3-dimensional space, comprising a laser device for rotatingly irradiating laser light that is mounted at a reference point, a laser beam detecting sensor placed at a measuring point which forms a first line between said reference point and said measuring point, a time measuring device for measuring time intervals between detection of laser beams and a computing device that receives measured values from said time measuring device for calculating angle between said first line and a reference line, said laser device being composed so that laser light sectors rotate in opposite angular directions at the same angular velocity, wherein said laser device has at least one prism means for splitting a laser beam from a laser oscillator means and for projecting said laser light sectors which rotate in opposite angular directions.

* * * * *